United States Patent [19]

Lund et al.

[11] Patent Number: 4,966,390
[45] Date of Patent: Oct. 30, 1990

[54] ANTI-ROLL SYSTEM WITH TILT LIMITATION

[75] Inventors: Mark A. Lund; Genevieve Garrabrant, both of Escondido, Calif.

[73] Assignee: Tilt Limitation Control, San Diego, Calif.

[21] Appl. No.: 397,723

[22] Filed: Aug. 23, 1989

[51] Int. Cl.$^5$ ............................................. B62D 9/02
[52] U.S. Cl. .................................. 280/772; 280/112.2; 280/689; 280/707
[58] Field of Search ...................... 280/772, 112.2, 684, 280/707

[56] References Cited

U.S. PATENT DOCUMENTS

| | | | |
|---|---|---|---|
| 1,999,452 | 4/1935 | Goldsmith | 280/772 |
| 3,704,027 | 11/1972 | Laudadio | 280/772 |
| 3,752,497 | 8/1973 | Enke et al. | 280/112.2 |
| 3,820,809 | 6/1974 | Blonar | 280/91 |
| 3,820,812 | 6/1974 | Stubbs et al. | 280/112.2 |
| 3,885,809 | 5/1975 | Archer | 280/112.2 |
| 4,103,920 | 8/1978 | Smith | 280/112.2 |
| 4,251,088 | 2/1981 | Shyu | 280/112.2 |
| 4,277,076 | 7/1981 | Hanna | 280/772 |
| 4,345,661 | 8/1982 | Nishikawa | 180/141 |
| 4,484,767 | 11/1984 | Klem | 280/772 |
| 4,589,678 | 5/1986 | Lund | 280/772 |
| 4,606,551 | 8/1986 | Toti et al. | 280/772 |
| 4,607,861 | 8/1986 | Eisenberg et al. | 280/702 |
| 4,761,022 | 8/1988 | Ohashi et al. | 280/772 |

*Primary Examiner*—Kenneth R. Rice
*Attorney, Agent, or Firm*—Baker, Maxham, Jester & Meador

[57] ABSTRACT

An anti-roll system for turn compensation in a vehicle generates a differential hydraulic signal in which a pressurizing potential corresponds to a first curve direction and a complementary return hydraulic potential. The system includes a pair of rear wheel cylinder and piston assemblies and a pair of front wheel cylinder and piston assemblies. A hydraulic circuit is connected to conduct the pressurizing potential to move the pistons in a first rear wheel cylinder and piston assembly and a first front wheel cylinder and piston assembly, while conducting the return signal to move the pistons in second front wheel cylinder and piston assembly and a second rear wheel cylinder and piston assembly. A hydraulic conductor directly connects corresponding ends of the rear wheel cylinder and piston assemblies to provide a hydraulic conduction between those assemblies in response to conduction of the differential hydraulic signal. A tilt limitation feature is provided in the front wheel cylinder and piston assemblies and is connected to the hydraulic circuit for limiting the maximum displacement of the pistons in the rear and front wheel cylinder and piston assemblies. In a vehicle, the system reacts to a turn by causing the front and rear wheel cylinder and piston assemblies to tilt the vehicle in a direction to counteract the vehicle rolling force caused by the turn. The tilt-limitation element operates to limit the amount of tilt produced by the system of the invention to counteract vehicle roll force.

22 Claims, 2 Drawing Sheets

ANTI-ROLL SYSTEM WITH TILT LIMITATION

BACKGROUND OF THE INVENTION

The present invention relates to a vehicle anti-roll system, and more particularly, to a hydraulically-operated anti-roll system which limits the amount of tilt induced in a vehicle to counteract turn-induced roll.

For the purpose of establishing the general environment in which the invention operates, it is asserted that a vehicle such as an automobile consists of a body, four tires, two front and two rear, a frame with axles for mounting the front and rear wheels, and a suspension for connecting the vehicle body to the axles.

When a vehicle turns, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower than the side of the body on the inside. Further, the vehicle body tends to pitch forward so that the front of the body is relatively lower than the rear. The pitch and roll combine to incline the vehicle body toward the front corner on the outside of the turn.

Anti-roll systems are known in the art which counteract vehicle roll by providing a lifting force acting between the vehicle body and suspension on the outside of the curve or a vehicle lowering force acting between the body and suspension on the inside turn side of the vehicle. Some anti-roll systems in the art provide complementary lifting and lowering forces simultaneously.

U.S. Pat. No. 3,752,497 of Enke et al illustrates an anti-roll system in which complementary lifting and lowering forces are applied. In the Enke et al patent, two sets of complementary lifting and lowering forces are provided, one set to the front wheels, and one set to the rear.

In U.S. Pat. No. 3,820,812 of Stubbs, an anti-roll system includes two separate assemblies, each working on the front and rear axles on a respective side of a vehicle. Each assembly provides a lifting or lowering force to its respective side, without reference to the action of the other assembly.

U.S. Pat. No. 3,885,809 of Pitcher illustrates an anti-roll system in which two separate correction units on opposite sides of the vehicle provide lifting and lowering forces to counteract roll. The Pitcher anti-roll system also includes a lift limitation assembly interconnected with the anti-roll system components and serving the rear of the vehicle.

U.S. Pat. No. 4,345,661 of Nishikawa provides a correcting force to one side of a vehicle to counteract turn-induced roll.

My U.S. Pat. No. 4,589,678 operates on the front wheels to counteract roll. It also provides limitation of front wheel correction by means of a piston controlled hydraulic line operating between a hydraulic reservoir and a cylinder and piston assembly.

All of these existing anti-roll systems utilize hydraulic circuitry and components for generating lifting and lowering forces. In each case, an element corresponding to a cylinder and piston assembly is positioned at a vehicle wheel and acts between the wheel and the vehicle body by moving a piston within a cylinder. Movement of the piston toward the top of the cylinder compresses the assembly's longitudinal profile and exerts a lowering force by drawing together the vehicle body and the wheel. Movement of the piston downwardly in the cylinder spreads the assembly longitudinally and exerts an erecting force which separates the body and the wheel. The operations of a plurality of such assemblies are coordinated by hydraulic circuitry. The circuitry reacts to roll forces by developing hydraulic signals in the form of pressurized hydraulic fluid, and delivering those signals in appropriate configurations to the cylinder and piston assemblies. None of the instances cited above provides a closed hydraulic circuit which connects all four front and rear cylinder and piston assemblies into an integrated anti-roll system in which all of the parts act cooperatively and in response to a single hydraulic signal. Beyond not teaching this combination, these references further do not suggest the joinder of such an anti-roll system with a tilt limitation feature which limits the degree of correcting tilt developed at all four wheels to counteract vehicle rolling. Neither do these references illustrate shock absorbency internal to the hydraulic components of an anti-roll system.

SUMMARY OF THE INVENTION

The inventor has observed that the response of a hydraulically-actuated anti-roll system is measurably enhanced by interconnection of all of its front and rear piston-operated components in a single, closed hydraulic circuit which operates in response to a single hydraulic signal indicative of vehicle roll forces.

The invention is a system for roll compensation in a vehicle having front and rear wheels, a frame for rotatably supporting these wheels, a vehicle body, and a suspension connecting the body to the frame. The anti-roll system of the invention includes a valved hydraulic signal generator for providing a differential hydraulic signal indicative of vehicle roll. The differential hydraulic signal is defined by a pressurizing hydraulic potential corresponding to a first turn direction and a return hydraulic potential corresponding to a second turn direction. A first pair of cylinder and piston assemblies are provided for rear wheel correction, and a second pair of cylinder and piston assemblies are provided for front wheel correction. The system includes a hydraulic circuit connected to the valved hydraulic signal generator and to the rear and front wheel cylinder and piston assemblies for conducting the single differential hydraulic signal to all of the cylinder and piston assemblies. In conducting the hydraulic signal, the circuit provides the pressurizing potential of the hydraulic signal to move the pistons in a first rear wheel assembly and a first front wheel assembly in a first correcting direction, while providing the return potential to move the pistons in the second rear wheel assembly and the second front wheel assembly in a second correcting direction. A hydraulic conductor directly connects corresponding ends of the rear wheel cylinder and piston assemblies to support hydraulic conduction between these assemblies in response to conduction of the differential hydraulic signal to all of the cylinder and piston assemblies. The system includes a tilt-limitation means connected to the hydraulic circuit for limiting the maximum displacement of the pistons in the front wheel cylinder and piston assemblies.

A principal object of this invention is to provide an improved anti-roll system for a vehicle.

Another object of this invention is to provide an anti-roll system which fully integrates all of its piston-actuated components in a single, closed hydraulic circuit.

A distinct advantage of the described anti-roll system is found in the limitation of the amount of corrective tilt introduced.

Other features of this invention, described below, also permit standard shock-absorbing suspension functions to be performed in response to vertical disturbances, such as jounce and rebound, without disturbing, or requiring operation of, the anti-roll function of this invention.

Other objects and distinct advantages of this invention will become evident when following description is read with reference to the below-described drawings.

DESCRIPTION OF THE PREFERRED EMBODIMENT

Figure 1:
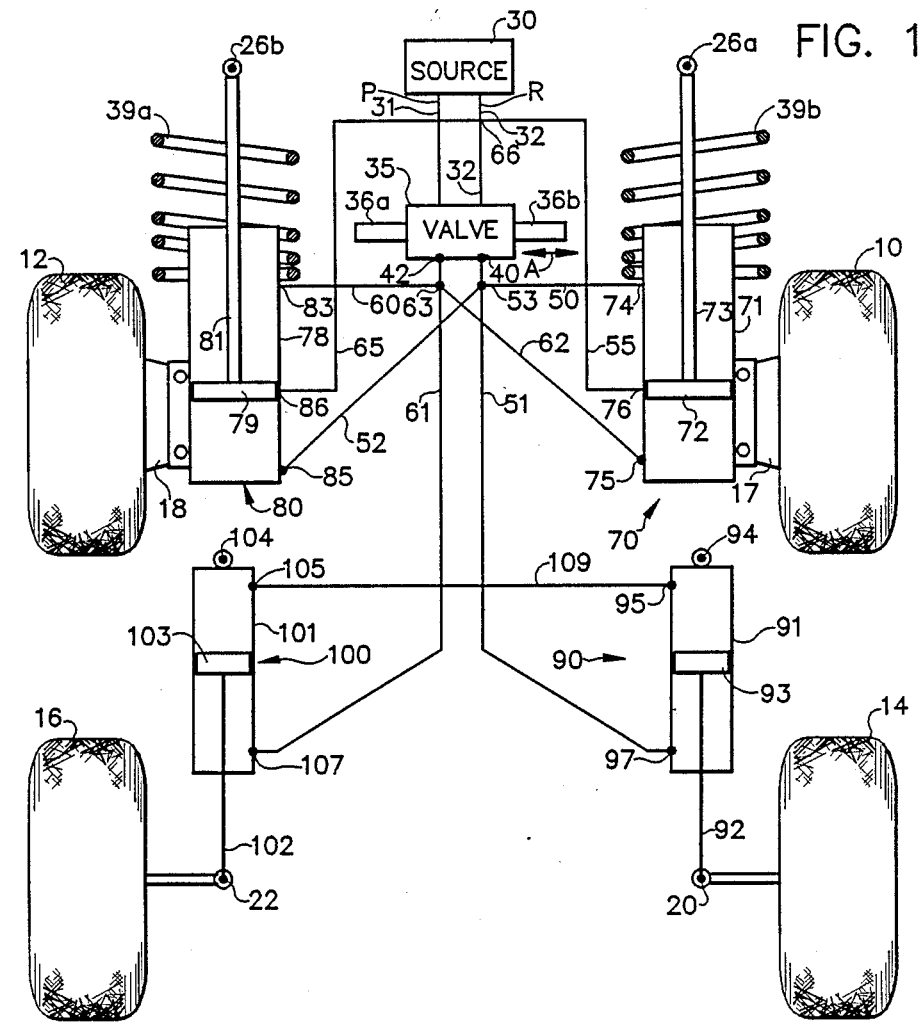
FIG. 1 is a hydraulic circuit representation demonstrative of the embodiment of the invention.

Referring to FIG. 1, the schematic representation of an automobile includes a pair of front wheels 10 and 12, a pair of rear wheels 14 and 16, and a frame with front axles for rotatably mounting the front wheels 10 and 12. The front axles include attachment points 17 and 18. The frame also includes rear axles for rotatably mounting the rear wheels 14 and 16, the rear axles having real axle mounting points 20 and 22. The frame, the vehicle body which is attached to the frame, and the suspension system which attaches the body to the frame, are not illustrated explicitly in FIG. 1. However, the mechanical interconnection of these parts with those illustrated in FIG. 1 and already described above is well known to the skilled artisan.

A hydraulic signal generator includes a conventional hydraulic pump 30 that continuously pumps hydraulic fluid under pressure. In the description which follows, the pumped, pressurized hydraulic fluid is referred to as a "differential signal" and includes complementary pressurizing (P) and return (R) potentials provided, respectively, through hydraulic lines 31 and 32. The hydraulic pump 30 is connected through the lines 31 and 32 to a conventional solenoid-operated, hydraulic spool valve 35, which includes a spool (not shown) and solenoid coils 36a and 36b for positioning the spool. The valve is anchored to the frame. The valve 35 can comprise, for example, a standard, electrically actuated, double acting, four-way free flow device which receives and forwards the R and P potentials produced by the hydraulic pump 30 with a polarity determined by the position of the spool 36. As is known, the spool can be moved within the valve 35 from a rest position in either of the directions indicated by the arrow A. At the rest position, the spool blocks the hydraulic signal from being transmitted by the valve. Movement in one direction provides the potentials P and R in one polarity. Movement of the spool in the opposite direction reverses the polarity of the potentials.

The valve 35 provides the differential hydraulic signal through ports 40 and 42. Hydraulic lines 50, 51, and 52 are connected in common to port 40 at node connector 53. Hydraulic lines 60, 61, and 62 are connected in common to valve port 42 through the node connector 63. A first front wheel cylinder and piston assembly 70 includes a cylinder 71 a piston assembly 72 and a piston shaft 73. The piston shaft 73 is connected at one end to the right front portion of the vehicle body at 26a. The cylinder 71 is connected to the right front axle at 17. The cylinder 71 includes an upper port 74, and lower port 75, and a position-sensing port 76 located between the ports 74 and 75. In the left front of the vehicle is provided a cylinder and piston assembly 80 having a cylinder 78, a piston assembly 79, and a piston shaft 81. The cylinder 78 is connected to the left front axle at 18, while the piston shaft 81 is anchored to the left front of the vehicle body at 26b. The cylinder 78 has upper port 83, lower port 85 and position-sensing port 86.

The right front cylinder and piston assembly 70 is connected at its upper port 74 to the hydraulic line 50, at its lower port 75 to the hydraulic line 62, and at its position-sensing port 76 to a hydraulic line 55, which is connected to the return R line of the hydraulic pump 30. Similarly, the cylinder 78 is connected at its upper port 83 to the hydraulic line 60, at its lower port 85 to the hydraulic line 52 and its position-sensing port 86 to the hydraulic line 65, the hydraulic line 65 being connected at 66 in common with the line 55 to the return line 32 port of the hydraulic pump 30.

A pair of rear wheel cylinder and piston assemblies 90 and 100 are disposed at, respectively, the right rear and left rear of the vehicle. The assembly 90 includes a cylinder 91 in which is disposed a piston 93 connected to a piston shaft 92. The piston shaft 92 is anchored at 20 to the right rear axle of the vehicle. The cylinder 91 is connected to the body of the vehicle at 94. The left rear cylinder and piston assembly 100 includes a cylinder 101, a piston 103, and a piston shaft 102. The piston shaft 102 is anchored to the left rear axle at 22, while the cylinder 101 is anchored to the left rear of the vehicle body at 104.

The cylinder and piston assembly 90 has a lower hydraulic port 97 connected to the hydraulic line 51, and a lower hydraulic port 97. The left cylinder and piston assembly 100 has a lower hydraulic port 107 connected to the hydraulic line 61, and an upper hydraulic port 105 connected through hydraulic circuit 109 to the upper port 95 of the assembly 90.

Figure 2:
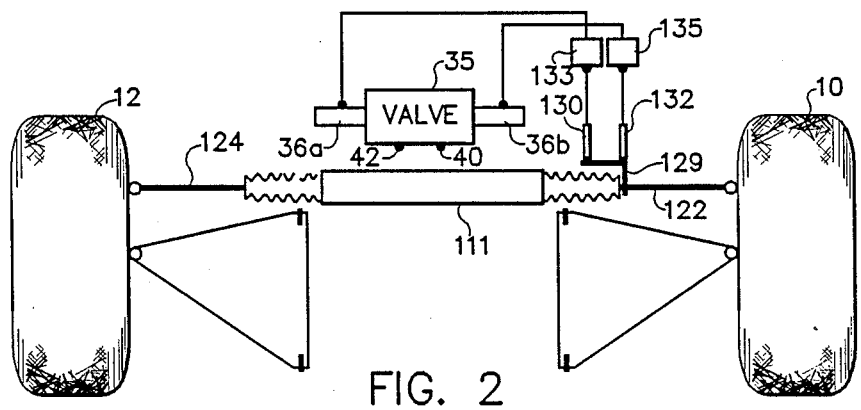
FIG. 2 is a schematic diagram illustrating control of the solenoid valve of FIG. 1.

Reference to FIG. 2 will provide an understanding of how the solenoid-driven valve 35 operates. The solenoid valve 35 is anchored to the vehicle body and generates a hydraulic signal for tilt correction in response to operation of the steering mechanism of the automobile in which the system of FIG. 1 is mounted. In this regard, the steering mechanism is conventional and includes a steering rack 121 which is stationarily attached to the vehicle. Steering is provided by the tie rods 122 and 124, each connected to a respective front wheel. For a right turn, the tie rod 122 is extended, while the rod 124 is retracted, causing the wheels 10, 12 to pivot toward the right. Correspondingly, for a left turn, the tie rod 124 extends, the tie rod 122 retracts, causing the wheels 10, 12 to pivot to the left. A control plate 129 is attached to the tie rod 122 to move with it and to provide an indication of turn direction. A preferred alternative is to locate the control plate on the steering column, which provides immediate indication of turn direction. A pair of proximity sensors are stationarily mounted to the vehicle body, adjacent the plate 129, to sense its position and to provide sense signals to a pair of relays 133 and 135, respectively. The relays 133 and 135 are connected to the solenoid coils 36a and 36b, respectively, of the solenoid valve 35.

When the vehicle is traveling in a straight line, the proximity sensor 129 will be adjacent both of the sensors 130 and 132, deactivating both of the relays 133 and 135. In this case, the solenoid coils are inactive and the valve spool is on a neutral position which blocks provision of the P and R potentials to the ports 40 and 42. A right-hand turn will move the plate 129 away from the sensor 130, activating the relay 133, and through it, the solenoid coil 36a. This will configure the solenoid valve 35 to provide the pressurizing signal potential through the port 42 and the return potential of the hydraulic signal through the port 40. Conversely, during a left-hand turn, the plate 129 moves away from the sensor 132, activating the relay 135, and through it, the coil 36b. This provides the pressurizing potential of the hydraulic signal through the port 40 and the return potential through the port 42.

Returning to FIG. 1, it is asserted that, as the vehicle executes a left-hand turn, the centrifugal forces generated tend to roll the vehicle body clockwise on its longitudinal axis, raising the inside (left) edge, and lowering the outside (right) edge of the body.

As a result, the right-hand cylinder and piston assemblies 70 and 90 are compressed, while the left-hand assemblies are expanded. This means that, on the right-hand side, the pistons 72 and 93 move downwardly and upwardly, respectively, in their cylinders. Correction requires reversing these directions. On the left-hand side of the vehicle, the pistons 79 and 103 move up and down, respectively, in their cylinders; correction requires reversal of these movements. The anti-roll correction provided by this invention will configure the hydraulic signal discussed above in such a manner as to provide hydraulic signal components to the assemblies 70 and 90 to counteract their compression, while providing hydraulic components to the assemblies 80 and 100 to counteract their expansion.

When the turn direction sensors 130 and 132 indicate that vehicle in which the system of FIG. 1 is mounted makes a left-hand turn, the relays 133 and 135 configure the value 35 such that the pressurizing potential is provided at the port 42 and the return potential at the port 40 of the valve 35. With the left-hand turn, the right-hand side of the vehicle rotates toward the ground, compressing the assemblies 70 and 90. The pressurizing potential of the hydraulic signal is provided, in the right-hand side of the vehicle, to the bottom port 75 of the assembly 70. At the same time, the return potential of the hydraulic signal is provided to the upper port 74 and lower port 97 of the right-hand cylinder and piston assemblies 70 and 90, respectively. Considering the right front assembly 70, the return potential at the upper port 74 permits the piston 72 to move upwardly in the cylinder 71. This potential is complemented by the pressurizing potential provided through the port 75, which pushes the piston 72 upwardly. Similarly, in the right rear cylinder and piston assembly, the return potential is conducted through the signal line 51 to the assembly 90 through the port 97, which permits the piston 93 to be pushed downwardly in the cylinder 91.

Continuing with the description of the right-hand turn correction, on the left-hand side of the vehicle, the pressurizing potential is conducted to the top of the piston 79 in the assembly 80, and to the bottom of the piston 103 in the assembly 100. The return potential is conducted to the bottom of the cylinder 79 in the assembly 80. With the piston 79 receiving the pressurizing potential on its top surface and the return potential on its bottom face, the piston will be moved downwardly in the cylinder 78, thereby compressing the assembly 80. Similarly, the pressurizing potential delivered to the bottom of the piston 103 through the port 107 will move the piston 103 upwardly in the cylinder 101, thereby compressing the assembly 100.

Completing the description of the circuit of FIG. 1, during the left-hand turn, upward movement of the piston 103 will displace hydraulic fluid from the upper portion cf the cylinder 101 into the upper portion of the cylinder 91 by the path 105, 109, 95. This will transfer the pressurizing potential to the upper surface of piston 93, thereby complementing the downward motion of the piston resulting from introduction of the return potential through the port 97.

For an understanding of the tilt limitation feature, recall that the return potential is provided to the position-sensing ports 76 and 86. The return potential will be introduced only when the respective piston has undergone a sufficient downward displacement. Upward displacement of the piston of a front wheel cylinder and piston assembly will not uncover the assembly's position sensor port.

Therefore, continuing with the left-hand turn explanation, the left-hand turn will tend to compress the right-hand cylinder and piston assemblies, resulting in a relative downward movement of the piston 72 within the cylinder 71 and an upward movement of piston 79 in cylinder 78. However, at the time that the left-hand turn is initiated, the corrective action of the anti-roll system described heretofore exerts a compressing correction on the left-hand assemblies 80 and 100. The compressing correction moves the piston 79 downwardly in the cylinder 78. When the piston 79 has undergone a sufficient downward displacement, the return potential is introduced into the upper portion of the cylinder 78 through the position sensing port 86. This "short-circuits" the return and pressurizing potentials of the hydraulic signal in the cylinders 78, 91, and 101 thereby preventing any further roll correction in either the left- or right-hand cylinder and piston assemblies. This effectively limits the amount of tilt which the system introduces to correct the roll experienced in the left-hand turn.

In operation, correction is introduced into the system any time the valve 35 is actuated in response to a change of steering angle from a neutral position. Thus, correction "leads" or "anticipates" slightly the roll of the vehicle. As the turn begins in response to steering, the roll force comes into effect. The roll and correction forces are kept in balance by the position sensing ports whose actions tend to keep the vehicle body level in a turn.

The skilled artisan will appreciate that the just-given explanation for left-hand turn correction, when reversed, will counteract the roll introduced by a right-hand turn.

After a turn has been completed, the steering assembly is returned to its neutral or straight-ahead configuration, thereby closing the solenoid valve 35, removing the return and pressurizing potentials of the hydraulic signal from the ports 40 and 42. This results in a return of the cylinder and piston assemblies 70, 80, 90 and 100, to their neutral positions. In the neutral positions, the pistons 72 and 79 are positioned in their respective cylinders at locations which cover the position-sensing ports of the cylinders.

Figure 3:
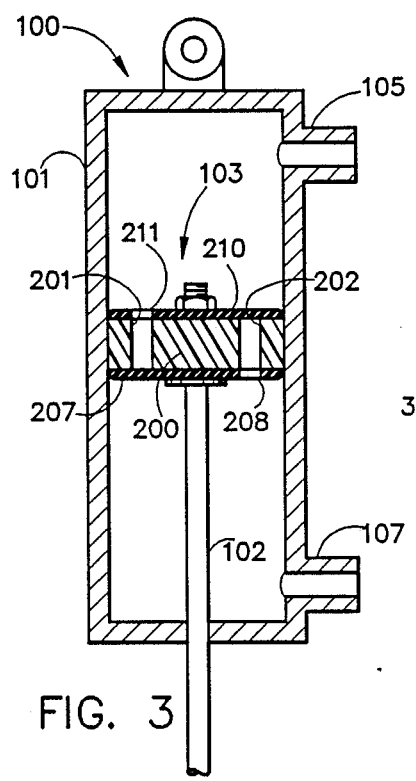
FIG. 3 is a side cutaway view illustrating a rear wheel cylinder and piston assembly with an internal, hydraulically-operated shock absorption provision.

FIG. 3 illustrates construction details of the rear wheel cylinder piston assemblies which will provide an understanding of how they operate to provide shock absorption, while also providing anti-roll correction. The rear wheel cylinder and piston assembly 100 is illustrated with the understanding that the illustration and the following explanation apply also to the assembly 90. The assembly 100 includes the cylinder 101 in which the piston 103 moves longitudinally. The piston 103 includes a piston body 200 with two throughports 201 and 202 which open completely through the body 200 between its upper and lower faces. Two valve springs 207 and 210 are provided on the lower and upper faces, respectively, of the piston body 200. The spring 207 covers and closes the lower end of the port 201, while the spring 210 covers and closes the upper end of the port 202. The spring 207 has an orifice 208 which communicates with the port 202, while the spring 210 has an orifice 211 which communicates with the port 201. Shock absorption is provided when the piston shaft 102 is displaced either up or down as the rear wheel to whose axle it is attached encounters a bump or a pothole. Assuming a bump, the shaft 102 transfers an upwardly-directed shock displacement to the piston 103. If the piston were solid, the incompressibility of the hydraulic fluid with which the cylinder 101 is filled would prevent the piston moving, assuming no complementary displacement of the piston in the opposite rear wheel cylinder and piston assembly. However, the upward force exerted on the piston 103 causes a relative displacement of hydraulic fluid downward through the through port 201 against the valve spring 207. Although the spring 207 closes the lower opening of the port 201, the spring will give way from the opening in response to the relatively downwardly-moving column of hydraulic fluid, thereby permitting the fluid to flow through the port 201. This permits the piston 103 to move upwardly in the cylinder 101. Similarly, downward motion of the piston in response to a sharp movement of the piston shaft 102 is permitted by movement of hydraulic fluid upwardly through the through port 202 against the spring 210. The inventor, recognizing the need to damp piston movement resulting from jounce (bumps) differently than piston movement resulting from rebound (potholes), has provided a spring constant for the spring 210 which is higher than the spring constant for the spring 207. Relatedly, the spring 210 may be thicker than the spring 207. During cornering, when the fluid is circulated through the ports 107 and 105, the spring 210 provides a compressing force that is greater than the extending force of the assembly 90. This pulls the inside rear corner of the vehicle down, counteracting the natural tendency of the vehicle to pitch diagonally, down at the outside front end and upwardly at the inside rear.

Figure 4:
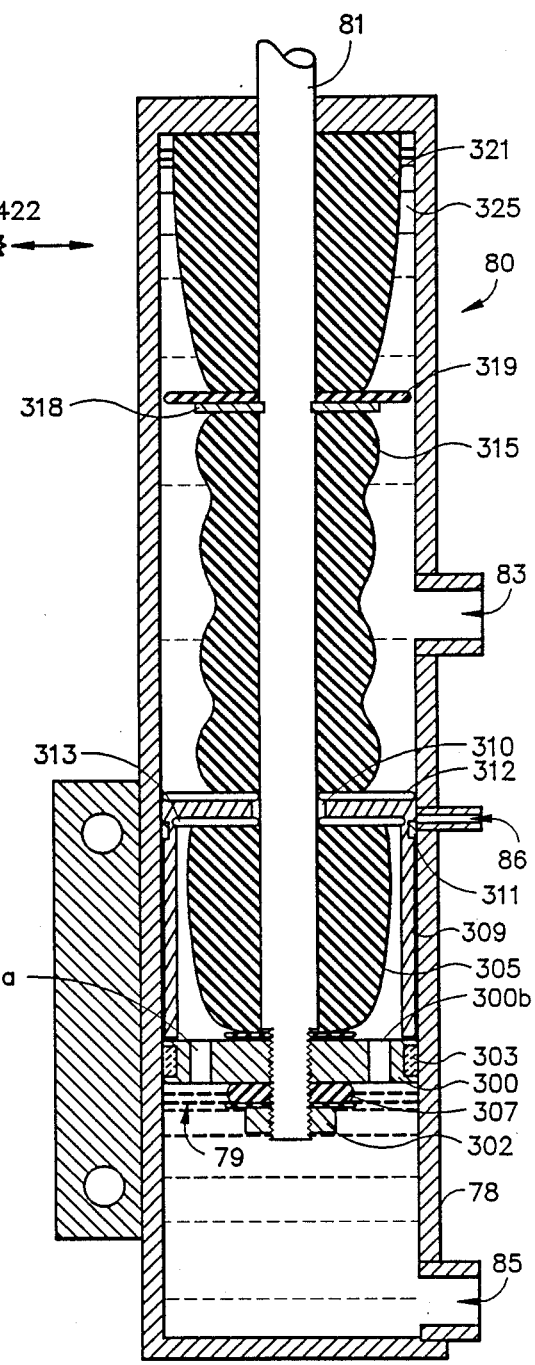
FIG. 4 is a side cutaway view showing a front wheel cylinder and piston assembly with an internal, hydraulically-actuated shock absorption provision.

FIG. 4 illustrates construction details of the front wheel cylinder and piston assemblies, which will provide an understanding of how they operate to provide shock absorption, while also providing an anti-roll correction. FIG. 4 illustrates in greater detail the assembly 80, with the understanding that the details of FIG. 4 are also found in the other front wheel cylinder and piston assembly 70. In the cylinder and piston assembly 80, the piston 79 comprises an assembly including a lower piston 300 fixed to the shaft 81 by a nut 302. The lower piston 300 has an disc configuration through which fluid access is provided by ports 300a and 300b. A non-metallic piston ring 303 positions the fixed piston 300 against the inner wall of the cylinder 78. A foam accumulator 305 is concentrically positioned on the shaft 81 above the fixed piston 300. A rubber washer 307 is placed at the bottom of the fixed piston. Disposed above the fixed piston 300 is a "floating" piston 309, which has an upside-down, open cup-like configuration. A metallic piston ring 311 seals the outer surface of the floating piston 309 against the inner surface of the cylinder 78. An upper rubber washer 312 provides a fluid-resistant seal between the shaft 81 and the central bore of the floating piston 309 through which the shaft 81 extends. A lower rubber washer 313 also provides a fluid-resistant seal between the shaft 81, and the central bore of the floating piston. A rigid annular retainer in the form of a metal disc 318 is attached to the shaft 81 to provide an upper stop for a rubber spring 315. The disc has a radius which is less than the radius of the cylinder 78. A flexible annular washer in the form of a rubber disc 319 is held concentrically on the shaft 81 above the disc 318. The washer 319 has a radius which is less than the radius of the cylinder 78, but greater than that of disc 318. The washer is preferably held against the disc by a retaining ring (not shown). An annular foam accumulator 321 is positioned concentrically on the piston shaft in the cylinder 78 between the upper end of the cylinder and the washer 319.

The rubber washer 312 extends radially to contact the interior surface of the cylinder 78; the washer 313 extends radially to contact the inner surface of the floating piston 309; therefore, the hydraulic fluid 325 can flow between the inner surface of the cylinder 78 and the perimeters of these washers. The inner bore 310 of the floating piston 309 has a larger diameter than the shaft 81. This allows the inside edges of the washers 312 and 313 to curl and permit fluid to pass momentarily. The piston 309 will follow, due to the curling resistance of the washers, and reseat.

The neutral position of the piston shaft 81 with respect to the cylinder 78 positions fixed and floating pistons 300 and 309 as illustrated in FIG. 4. In this regard, the floating piston 309 is positioned so that its upper edge is just above the position-sensing port 86. This seals the port, preventing the introduction of the return potential into the cylinder 78. Assume now that a left-hand turn is begun, in which case, the cylinder and piston assembly 80 will expand, moving the piston assembly 79 upwardly in the cylinder 78. Immediately, the solenoid valve 35 is configured to provide the pressurizing potential through the upper port 83 and the return component through the lower port 85, to counteract the upward displacement of the piston assembly 79. Now, the pressurizing potential presses downwardly on the floating piston 309. The net effect is to produce a downward correcting motion on the floating piston 309. This moves the entire piston assembly 79 downwardly until the combination of compression of the washer 307 and downward movement of the fixed piston 300 displaces floating piston 309 downwardly by an amount sufficient to uncover the position sensing port 86. At this point, the pressurizing potential component will be "short circuited" through the port 86, preventing any further downward movement of the piston assembly 79. When these correcting forces are removed, the mechanical suspension of the automobile will move the piston assembly 79 back to the unactivated, neutral position illustrated in FIG. 4.

Next, when the correction potentials are reversed so that the port 85 is pressurized and the return potential is provided in the port 83, the net pressure acting on the fixed piston 300 will move it upwardly, and with it the floating piston 309. As inspection of FIG. 4 will confirm, the floating piston 309 must be displaced upwardly a significant distance before the port 86 is uncovered. However, before the floating piston can be displaced by this distance, the floating piston in the right front cylinder and piston assembly will have been displaced downwardly, thereby shorting the return to the pressurizing potential through the upper portion of the cylinder 71.

Assume now that the left front wheel encounters a bump, resulting in a sudden displacement of hydraulic fluid upwardly through the port 300a and 300b of the fixed piston 300. The amount of flow is determined by the ratio of the total area of the ports 300a and 300b to the total surface area of the upper face of the fixed piston 300 and ports 83, 85 and flow into the upper portion of the cylinder. Displacement of hydraulic fluid upwardly is transferred against the lower face of the floating piston 309, resulting in a upward displacement of the floating piston against the force of the spring 315. Upward displacement of the floating piston 309 causes the outward edge of the washer 319 to curl upwardly, which permits hydraulic fluid 325 to be displaced upwardly into the top of the cylinder 78. Displacement in this direction is absorbed by compression of the foam 321. After upward displacement by the bump, the cylinder and piston assembly 80 is returned to its neutral configuration of FIG. 4 by the mechanical suspension components, including the external springs 39a and b illustrated in FIG. 1, which act between the body of the vehicle and the cylinder 78.

Next assume that the left front wheel 12 encounters a pothole. In this case, the cylinder 78 is pulled downwardly with respect to the piston assembly 79. Now, the hydraulic fluid in the lower portion of the cylinder 78 is increased by flow through port 85 and moves downwardly, from the interior of the piston 300 as aided by expansion of the foam 305. Simultaneously, hydraulic fluid is forced downwardly from the top of the cylinder 78; the downward displacement being accompanied by compression of the foam 321. However, the displacement of fluid downwardly past the washer 319 is relatively slower than upward displacement past the washer 319 because downward curvature of the washer is limited by the disc 318. The downward displacement of the hydraulic fluid acts against the floating piston 309 to keep it forced against the rubber washer 307. Again, when the pothole is passed, the external mechanical suspension components of the vehicle return the cylinder and piston assembly of FIG. 4 to their neutral positions.

Figure 5:
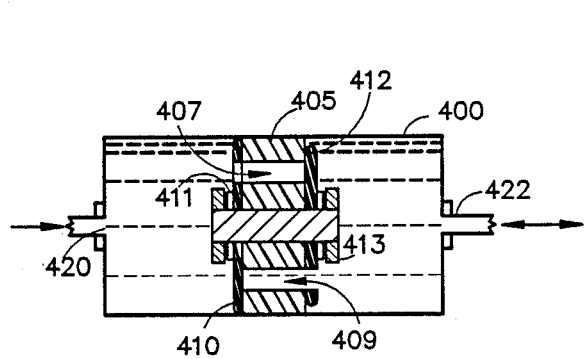
FIG. 5 illustrates a damper assembly interposed between the two rear wheel cylinder and piston assemblies.

Sudden surges of hydraulic fluid in the system of FIG. 1 are dampened by the damping mechanism of FIG. 5. The damping mechanism of FIG. 5 consists of a cylinder 400 with a stationary annular disk 405 with throughports 407 and 409. A pair of valve springs 410 and 412 are disposed on respective opposing faces of the annular disk 405. Spring 140 has an opening 411 which communicates with the port 407; the spring 412 has an opening 413 which communicates with the throughport 409. The spring constant of the springs 410 and 412 are substantially equal. The damping mechanism of 400 operates in much the same manner as the shock absorbing element of the pistons in the front and rear wheel assemblies 90 and 100 with the exception that the annular disk 405 does not move. In this regard, a sudden surge of hydraulic fluid into the port 420 will be communicated through the port 407 against the spring 412. If the surge is of sufficient magnitude, the spring 412 will be slightly displaced to permit displacement of fluid from the left to the right-hand side of the cylinder 400. Similarly, a surge of hydraulic fluid entering the cylinder 400 through the port 422 will be dampened by the spring 410.

The system of the invention may also be damped by placement of a one-way damper in the return line 32.

With this description, it should be evident to those skilled in the art that my invention can be practiced other than as described above, without departing from the spirit of these teachings.

I claim:

1. A system for roll compensation in a vehicle having front and rear wheels, a frame with means for rotatably supporting said wheels, a vehicle body, and a suspension, said system comprising:

valved hydraulic signal means for providing a differential hydraulic signal indicative of vehicle turn direction, said differential hydraulic signal including a pressurizing hydraulic potential and a return hydraulic potential;

a pair of rear wheel hydraulic cylinder and piston assemblies acting between said body and said rear wheels;

a pair of front wheel hydraulic cylinder and piston assemblies acting between said body and said front wheels;

a hydraulic circuit connected to said valved hydraulic signal means and to said rear wheel and front wheel cylinder and piston assemblies for conducting said differential hydraulic signal to said rear wheel and front wheel cylinder and piston assemblies by providing said pressurizing hydraulic potential to move the pistons in a first rear wheel and a first front wheel cylinder and piston assembly while providing said return potential to move the pistons in the second rear wheel and the second front wheel cylinder and piston assemblies;

a hydraulic conductor directly connecting corresponding ends of said rear wheel cylinder and piston assemblies for hydraulically conducting between said rear wheel cylinder and piston assemblies in response to conduction of said differential hydraulic signal to said rear wheel cylinder and piston assemblies; and tilt-limitation means connected to said hydraulic circuit for limiting the maximum displacement of the pistons in said front wheel cylinder and piston assemblies by return conduction of said pressurizing hydraulic potential.

2. The anti-roll system of claim 1, further including ported means in the pistons of said rear wheel cylinder and piston assemblies for permitting shock displacement of said pistons.

3. The anti-roll system of claim 1 wherein said tilt-limitation means includes a tilt limiter in a front wheel cylinder and piston assembly and connected by said valued hydraulic signal means to said return potential.

4. The anti-roll system of claim 3 wherein said tilt limiter includes a first port in a respective front wheel cylinder and piston assembly, said port being hydraulically return-connected to said valved hydraulic signal means.

5. The anti-roll system of claim 2 wherein, for each of said pistons, said ported means includes a first port with a biased port cover for conducting hydraulic fluids in a first direction through said piston and a second port with a biased port cover for conducting hydraulic fluid in a second direction through said piston, said first direction being substantially opposite to said second direction.

6. The anti-roll system of claim 4 wherein said front wheel cylinder and piston assembly includes a second port connected to said hydraulic circuit for conducting said pressurizing hydraulic potential into said front wheel cylinder and piston assembly, and a moveable piston, said moveable piston being in a first position closing said first port to said second port and moving to a second position opening said first port to said second port in response to said second port conducting said pressurizing hydraulic potential into said front wheel cylinder and piston assembly.

7. The anti-roll system of claim 3 wherein each of said front wheel cylinder and piston assemblies includes a tilt limiter.

8. The anti-roll system of claim 1 further including, in each of said front wheel cylinder and piston assemblies ported means for permitting shock displacement of the pistons of said front wheel cylinder and piston assemblies.

9. The anti-roll system of claim 4, further including a damping means in said hydraulic circuit for damping hydraulic surges.

10. A shock-absorbing hydraulic cylinder and piston assembly comprising:
   a cylinder with upper and lower ports, each of said ports opening into the interior of said cylinder;
   a piston means slidably contained within said cylinder for reciprocal, hydraulically-actuated movement within said cylinder between said ports; and
   a first piston port opening between each end of said piston, a first flexible port cover attached to a first end of said piston and biased against said first end of said piston to cover one end of said first port, a second port through said piston between said first and second ends, and a second flexible port cover attached to said second end and biased against said second end to cover one end of said second port.

11. A hydraulic cylinder and piston assembly, comprising:
   a cylinder with spaced-apart first and second hydraulic ports, each of said ports opening into the interior of said cylinder;
   a position sensing port opening into the interior of said cylinder, said position sensing port located between said first and second ports;
   a piston rod in said cylinder;
   a piston means attached to said piston rod and slidably contained within said cylinder for reciprocal, hydraulically-actuated movement between said lower and said position sensing ports;
   a floating piston in said cylinder coaxial with said piston rod for reciprocal movement within said cylinder between said fixed piston and said position sensing port; and
   means for positioning said floating piston with respect to said position-sensing port such that said floating piston is moved to uncover said position sensing port in response to hydraulic pressurization of the interior of said cylinder through said first port and is moved by said means to cover said position-sensing port when said pressurizing hydraulic potential is removed from said first port.

12. The hydraulic cylinder and piston assembly of claim 11, wherein said floating piston includes a hollow cylinder with an open end and a closed end, said closed end including a central bore for receiving said piston rod.

13. The hydraulic cylinder and piston assembly of claim 12, wherein said open end of said floating piston contacts said piston means.

14. The hydraulic cylinder and piston assembly of claim 11, further including a shock-absorbing assembly, said assembly comprising:
   a rigid annular retainer attached coaxially to said piston rod, said floating piston being positioned between said rigid annular retainer and said rigid piston means, said annular retainer having a radius less than the radius of said cylinder; and
   a flexible annular washer seated coaxially on said piston rod against said rigid annular retainer, said flexible annular washer having a radius less than the radius of said cylinder but greater than the radius of said rigid annular retainer.

15. The hydraulic cylinder and piston assembly of claim 14, further including a springlike structure acting between said shock absorbing assembly and said cylinder 16. The hydraulic cylinder and piston assembly of claim 14, further including a springlike structure acting between said shock absorbing assembly and said floating piston.

17. The hydraulic cylinder and piston assembly of claim 14, further including a springlike structure acting between said floating piston and said piston means.

18. The hydraulic cylinder and piston assembly of claim 14, further including:
   a first springlike structure acting between said shock absorbing assembly and said cylinder;
   a second springlike structure acting between said shock absorbing assembly and said floating piston; and
   a third springlike structure acting between said floating piston and said piston means.

19. A system for roll compensation in a vehicle having a body, wheels, and a suspension connecting the body and the wheels, the system comprising:
   a first cylinder and piston assembly attached to the vehicle between the body and a wheel on a first side of the vehicle, the first cylinder and piston assembly including upper and lower fluid ports;
   a second cylinder and piston assembly attached to the vehicle between the body and a wheel on a second side of the vehicle, the second cylinder and piston assembly including upper and lower fluid ports;
   a fluid circuit means attached to the upper and lower fluid ports of the first and second cylinder and piston assemblies and responsive to a vehicle turn for conducting fluid to compress or expand the first and second cylinder and piston assemblies;
   a first position-sensing port means in the first cylinder and piston assembly between the upper and lower ports and connected to the fluid circuit means for conducting fluid to the fluid circuit means from the first cylinder and piston assembly in response to piston movement of the first cylinder and piston assembly; and a second position-sensing port means in the second cylinder and piston assembly between the upper and lower ports and connected to the fluid circuit means for conducting fluid to the fluid circuit means from the second cylinder and piston assembly in response to piston movement of the second cylinder and piston assembly.

20. The system of claim 19 wherein the first cylinder and piston assembly includes a moveable piston and said position-sensing port means of the first cylinder and piston assembly includes a position-sensing port between the upper and lower ports, the moveable piston being in a first position closing the position-sensing port to said upper and lower ports and moving to a second position opening the position-sensing port to the upper port in response to conducting fluid into the first cylinder and piston assembly through the upper port.

21. The system of claim 19 wherein the second cylinder and piston assembly includes a moveable piston and said position-sensing port means of the second cylinder and piston assembly includes a position-sensing port between the upper and lower ports, the moveable piston being in a first position closing the position-sensing port to said upper and lower ports and moving to a second position opening the position-sensing port to the upper port in response to conducting fluid into the second cylinder and piston assembly through the upper port.

22. A system for roll compensation in a vehicle having a body, wheels, and a suspension connecting the body and the wheels, the system comprising:

a plurality of cylinder and piston assemblies, each cylinder and piston assembly including a cylinder with a first and second port, and a piston slidable in the cylinder between the first and second ports;

a first pair of the cylinder and piston assemblies being attached to one side of the vehicle, each of the first pair being attached between the body and a wheel;

a second pair of the cylinder and piston assemblies being attached to attached to a second side of the vehicle, the second side being opposite the first side, each of the second pair being attached between the body and a wheel;

a fluid circuit means connected to the first and second ports of the plurality of cylinder and piston assemblies for providing a differential fluid signal with pressurizing and return components for alternately compressing and expanding the plurality of cylinder and piston assemblies by conduction of the fluid signal to the cylinder and piston assemblies in response to a vehicle turn;

in one cylinder and piston assembly of the first pair of cylinder and piston assemblies, a position-sensing port in the cylinder between the first and second ports of the cylinder and piston assembly and connected to the fluid circuit means for returning fluid from the cylinder and piston assembly to the fluid circuit means in response to movement of the piston of the cylinder and piston assembly, the piston being in a first position closing the position-sensing port and moving to a second position opening the position-sensing port in response to the differential fluid signal; and in one cylinder and piston assembly of the second pair of cylinder and piston assemblies, a position-sensing port in the cylinder between the first and second ports of the cylinder and piston assembly and connected to the fluid circuit means for returning fluid from the cylinder and piston assembly to the fluid circuit means in response to movement of the piston of the cylinder and piston assembly, the piston being in a first position closing the position-sensing port and moving to a second position opening the position-sensing port in response to the differential fluid signal.

* * * * *